S. N. Beecher.
Sliding Seat for Carriages.
No. 75841      Patented Mar. 24, 1868.
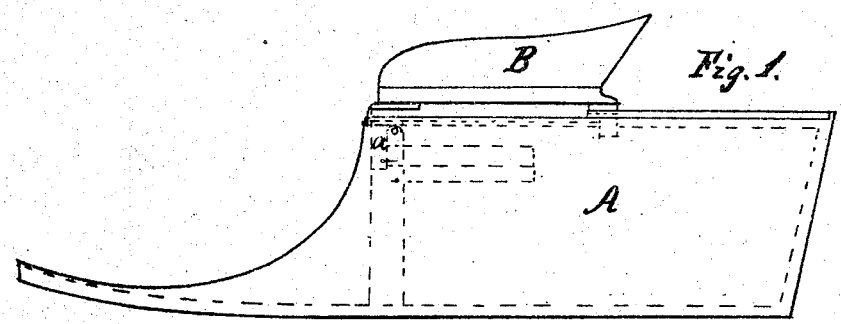
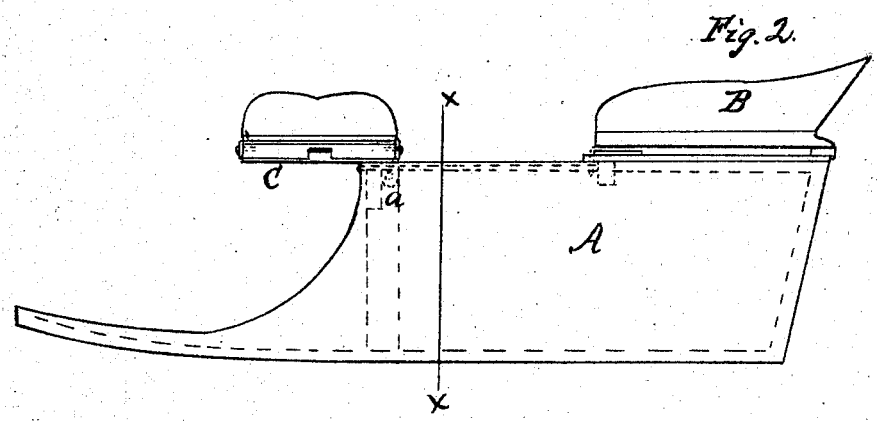
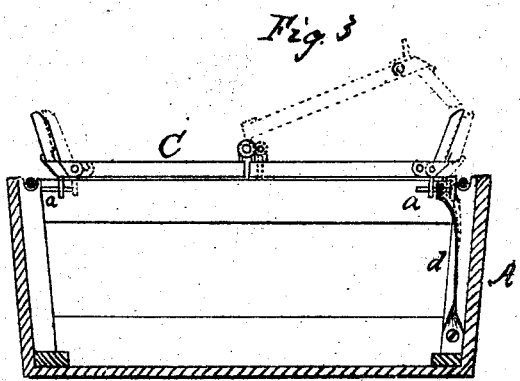
Witnesses.
John H. Shumway
a. g. Tibbits
Inventor.
Samuel N. Beecher
By his Attorney
Thi. E. Earle

United States Patent Office.

SAMUEL N. BEECHER, OF MILFORD, CONNECTICUT, ASSIGNOR TO HIMSELF AND CHARLES W. MILES, OF SAME PLACE.

Letters Patent No. 75,841, dated March 24, 1868.

IMPROVEMENT IN SLIDING SEAT FOR CARRIAGES.

The Schedule referred to in these Letters Patent and making part of the same.

TO ALL WHOM IT MAY CONCERN:

Be it known that I, SAMUEL N. BEECHER, of Milford, in the county of New Haven, and State of Connecticut, have invented a new Improvement in Slide-Seat Carriages; and I do hereby declare the following, when taken in connection with the accompanying drawings, and the letters of reference marked thereon, to be a full, clear, and exact description of the same, and which said drawings constitute part of this specification, and represent, in—

Figure 1, a side view, showing a carriage as a single seat.

Figure 2, a like view as a double seat; and in

Figure 3 a section on line $x\,x$, looking to the front.

This invention relates to an improvement in what are termed slide-seat carriages, that is to say, arranged so that the principal seat will slide back, and a second seat, underneath the principal seat, is turned up and over, so as to form a second seat, as denoted in fig. 2. A great objection to this class of carriages has arisen from the difficulty of entering the carriage, as it was necessary either to climb over the side between the two seats or over the front seat. My invention consists in the peculiar construction and arrangement of the second seat, whereby these objections are entirely overcome.

To enable others to construct my improvement, I will proceed to describe the same as illustrated in the accompanying drawings.

A is the body; B, the principal seat, arranged to slide back in proper guides, as from the position in fig. 1 to that denoted in fig. 2, in the usual manner; C, the second seat, is hinged at $a$, so as to turn over in the position denoted in fig. 1, to permit the seat B to pass freely over it, or out, as seen in fig. 2. I hinge the seat C in or near the centre, so as to form two parts, as seen in fig. 3, and the two parts supported upon pivots $a$, so as to turn freely thereon. The pivot $a$ has a spring, $d$, working upon it, so as to bear the seat toward the opposite side, as denoted in fig. 3, and thus hold the seat upon the pivot at the opposite end. When it is desired to enter the carriage, press the seat C against the spring $d$ until the pivot upon the opposite side to the spring is clear, as denoted in red; then turn up the seat, as denoted in blue, and the person may enter to the back seat without the necessity of climbing over the front seat; then, when the seat is again turned down, press back the spring until the seat will pass on to the pivot as before. Thus, by a convenient arrangement, I have overcome the difficulties existing in this class of carriages.

I am aware that carriage-seats have been constructed to double in the centre, and I do not, therefore, wish to be understood as broadly claiming such as my invention, but What I do claim as new and useful, and desire to secure by Letters Patent, is—

The arrangement of the spring $d$ upon one end of the double seat, in combination with the catch or pivot $a$ upon the other end of the double seat, so as to operate to permit the folding of the seat as set forth.

SAMUEL N. BEECHER.

Witnesses:
JOHN E. EARLE,
A. J. TIBBITS.